United States Patent
Roh et al.

(10) Patent No.: US 10,283,865 B2
(45) Date of Patent: May 7, 2019

(54) MULTIBAND ANTENNA AND ELECTRONIC DEVICE INCLUDING THE SAME

(71) Applicant: Samsung Electronics Co., Ltd., Gyeonggi-do (KR)

(72) Inventors: Hyun Seock Roh, Gyeonggi-do (KR); Sang Bong Sung, Gyeonggi-do (KR); Seong Yong An, Gyeonggi-do (KR); Se Woong Kim, Gyeongsangnam-do (KR); Ji Ho Kim, Gyeonggi-do (KR); Gyu Bok Park, Gyeonggi-do (KR); Kyung Moon Seol, Seoul (KR); Shin Ho Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 304 days.

(21) Appl. No.: 15/165,415

(22) Filed: May 26, 2016

(65) Prior Publication Data
US 2016/0352015 A1 Dec. 1, 2016

(30) Foreign Application Priority Data
May 27, 2015 (KR) .......................... 10-2015-0074261

(51) Int. Cl.
*H01Q 1/24* (2006.01)
*H01Q 5/50* (2015.01)
(Continued)

(52) U.S. Cl.
CPC .............. *H01Q 5/50* (2015.01); *H01Q 1/243* (2013.01); *H01Q 1/48* (2013.01); *H01Q 5/307* (2015.01);
(Continued)

(58) Field of Classification Search
CPC .......... H01Q 1/243; H01Q 5/00; H01Q 21/28; H01Q 9/30; H01Q 3/24
(Continued)

(56) References Cited

U.S. PATENT DOCUMENTS

| 6,891,506 B2 | 5/2005 | Jarmuszewski et al. |
| 7,183,984 B2 | 2/2007 | Jarmuszewski et al. |

(Continued)

FOREIGN PATENT DOCUMENTS

| CN | 1663072 | 8/2005 |
| CN | 101496224 | 7/2009 |

(Continued)

OTHER PUBLICATIONS

European Search Report dated Nov. 4, 2016 issued in counterpart application No. 16171650.1-1811, 10 pages.
(Continued)

*Primary Examiner* — Joseph J Lauture
(74) *Attorney, Agent, or Firm* — The Farrell Law Firm, P.C.

(57) ABSTRACT

An electronic device is provided. The electronic device includes a housing including a first surface, a second surface facing the first surface, and side surfaces surrounding a space between the first surface and the second surface, a first conductive member and a second conductive member forming at least part of the side surfaces, being parallel to the first surface, and extending parallel to each other, a first nonconductive member disposed between the first conductive member and the second conductive member to electrically isolate the first conductive member and the second conductive member from each other, and a communication circuit that performs wireless communication by using the first conductive member and the second conductive member as radiators.

16 Claims, 18 Drawing Sheets

(51) Int. Cl.
*H04W 4/80* (2018.01)
*H01Q 1/48* (2006.01)
*H01Q 9/04* (2006.01)
*H01Q 5/307* (2015.01)
*H01Q 5/328* (2015.01)
*H01Q 5/00* (2015.01)
*H01Q 21/28* (2006.01)
*H01Q 3/24* (2006.01)
*H01Q 7/00* (2006.01)
*H01Q 9/30* (2006.01)

(52) U.S. Cl.
CPC ............... *H01Q 5/328* (2015.01); *H01Q 9/04* (2013.01); *H04W 4/80* (2018.02); *H01Q 3/24* (2013.01); *H01Q 5/00* (2013.01); *H01Q 7/00* (2013.01); *H01Q 9/30* (2013.01); *H01Q 21/28* (2013.01)

(58) Field of Classification Search
USPC ......... 343/702, 700 MS, 722, 727, 750, 745, 343/852, 876
See application file for complete search history.

(56) References Cited

U.S. PATENT DOCUMENTS

| | | |
|---|---|---|
| 8,199,057 B2 | 6/2012 | Ishizuka et al. |
| 9,166,279 B2 | 10/2015 | Jin et al. |
| 9,287,612 B2 | 3/2016 | Bolin et al. |
| 9,588,546 B2 | 3/2017 | Galeev |
| 2004/0075613 A1 | 4/2004 | Jarmuszewski et al. |
| 2004/0139379 A1 | 7/2004 | Tatsuzawa |
| 2005/0017906 A1 | 1/2005 | Man et al. |
| 2005/0200537 A1 | 9/2005 | Jarmuszewski et al. |
| 2009/0128428 A1 | 5/2009 | Ishizuka et al. |
| 2009/0197654 A1 | 8/2009 | Teshlma et al. |
| 2012/0229347 A1 | 9/2012 | Jin et al. |
| 2013/0194138 A1 | 8/2013 | Hammond |
| 2014/0120979 A1 | 5/2014 | Galeev |
| 2014/0139379 A1 | 5/2014 | Bolin et al. |
| 2014/0139380 A1 | 5/2014 | Ouyang et al. |
| 2014/0354483 A1* | 12/2014 | Azad ...................... H01Q 1/243 343/700 MS |
| 2014/0361934 A1* | 12/2014 | Ely ......................... C23C 14/16 343/702 |

FOREIGN PATENT DOCUMENTS

| | | |
|---|---|---|
| CN | 102684722 | 9/2012 |
| CN | 103545610 | 1/2014 |
| CN | 103795429 | 5/2014 |
| CN | 103825086 | 5/2014 |
| EP | 2 048 739 | 4/2009 |

OTHER PUBLICATIONS

European Search Report dated Sep. 14, 2017 issued in counterpart application No. 16171650.1-1927, 7 pages.
Chinese Office Action dated May 24, 2018 issued in counterpart application No. 201610364388.2, 31 pages.
European Search Report dated Jun. 12, 2018 issued in counterpart application No. 16171650.1-1205, 7 pages.

* cited by examiner

MULTIBAND ANTENNA AND ELECTRONIC DEVICE INCLUDING THE SAME

This application claims priority under 35 U.S.C. § 119(a) to Korean Patent Application Serial No. 2015-0074261, which was filed on May 27, 2015 in the Korean Intellectual Property Office, the entire disclosure of which is incorporated herein by reference.

BACKGROUND

1. Field of the Disclosure

The present disclosure relates generally to an antenna, and more particularly, to a multiband antenna that transmits and receives signals of various bands.

2. Description of the Related Art

Electronic devices such as smartphones or tablet PCs perform various functions including a voice communication, a wireless data communication, and a media output, and recently, various functions such as a wireless payment, wireless charging, and a short range communication have been added.

The aforementioned functions may be performed by transmitting and receiving signals through various antennas mounted to an interior of the electronic device. Various studies for efficiently disposing various types of antennas in a limited mounting space and improving radiation performance by reducing mutual interferences have been made.

When the outside of the electronic device is manufactured using a metal frame, the metal frame may be utilized as an antenna radiator. With conventional electronic devices, when a side frame is utilized as an antenna, the side frame is partitioned into sections by a longitudinal partition (in a direction perpendicular to a surface on which a display is disposed) and the partitioned sections are utilized as antenna radiators.

In the case of an antenna using a side frame, a separate additional pattern may need to be mounted to implement a multiband antenna, and the size of the electronic device becomes larger due to the additional patterns or the additional patterns, which may cause interferences with peripheral antennas or circuits. When the side frame is utilized as an antenna for a cellular communication, radiation performance may deteriorate due to a contact with a hand or a head of the user.

Further, in the case of an antenna that is used for a wireless payment, the antenna is mounted to an interior of the electronic device, which may cause a recognition rate by an external payment terminal to decrease.

SUMMARY

Aspects of the present disclosure have been made to address at least the above-mentioned problems and/or disadvantages and to provide at least the advantages described below. Accordingly, an aspect of the present disclosure is to provide a multiband antenna that transmits and receives multiband signals by partitioning a side frame through a transverse partition part extending in a direction parallel to a front surface (or a display surface) of an electronic device and by using the partitioned side frame, and an electronic device including the same.

In accordance with an aspect of the present disclosure, there is provided an electronic device. The electronic device includes a housing including a first surface, a second surface facing the first surface, and side surfaces surrounding a space between the first surface and the second surface, a first conductive member and a second conductive member forming at least part of the side surfaces, being parallel to the first surface, and extending parallel to each other, a first nonconductive member disposed between the first conductive member and the second conductive member to electrically isolate the first conductive member and the second conductive member from each other, and a communication circuit that performs wireless communication by using the first conductive member and the second conductive member as radiators.

In accordance with an aspect of the present disclosure, there is provided an electronic device. The electronic device includes a housing including a first surface, a second surface facing the first surface, and side surfaces surrounding a space between the first surface and the second surface, a first conductive member forming at least part of the side surfaces, a second conductive member forming a part of at least one of the first surface and the second surface, a first nonconductive member disposed between the first conductive member and the second conductive member to electrically isolate the first conductive member and the second conductive member from each other, and a communication circuit that performs wireless communication by using at least one of the first conductive and the second conductive member as a radiator.

In accordance with an aspect of the present disclosure, there is provided an electronic device. The electronic device includes a conductive member surrounding a side surface of the electronic device, and a first nonconductive member extending in a direction parallel to one of a front surface and a rear surface of the electronic device to partition the conductive member, wherein the conductive member is utilized as an antenna radiator.

In accordance with an aspect of the present disclosure, there is provided an antenna mounted on an electronic device. The antenna includes a conductive member disposed on a side surface of the electronic device and a first nonconductive member extending in a direction parallel to one of a front surface and a rear surface of the electronic device to partition the conductive member.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1A:
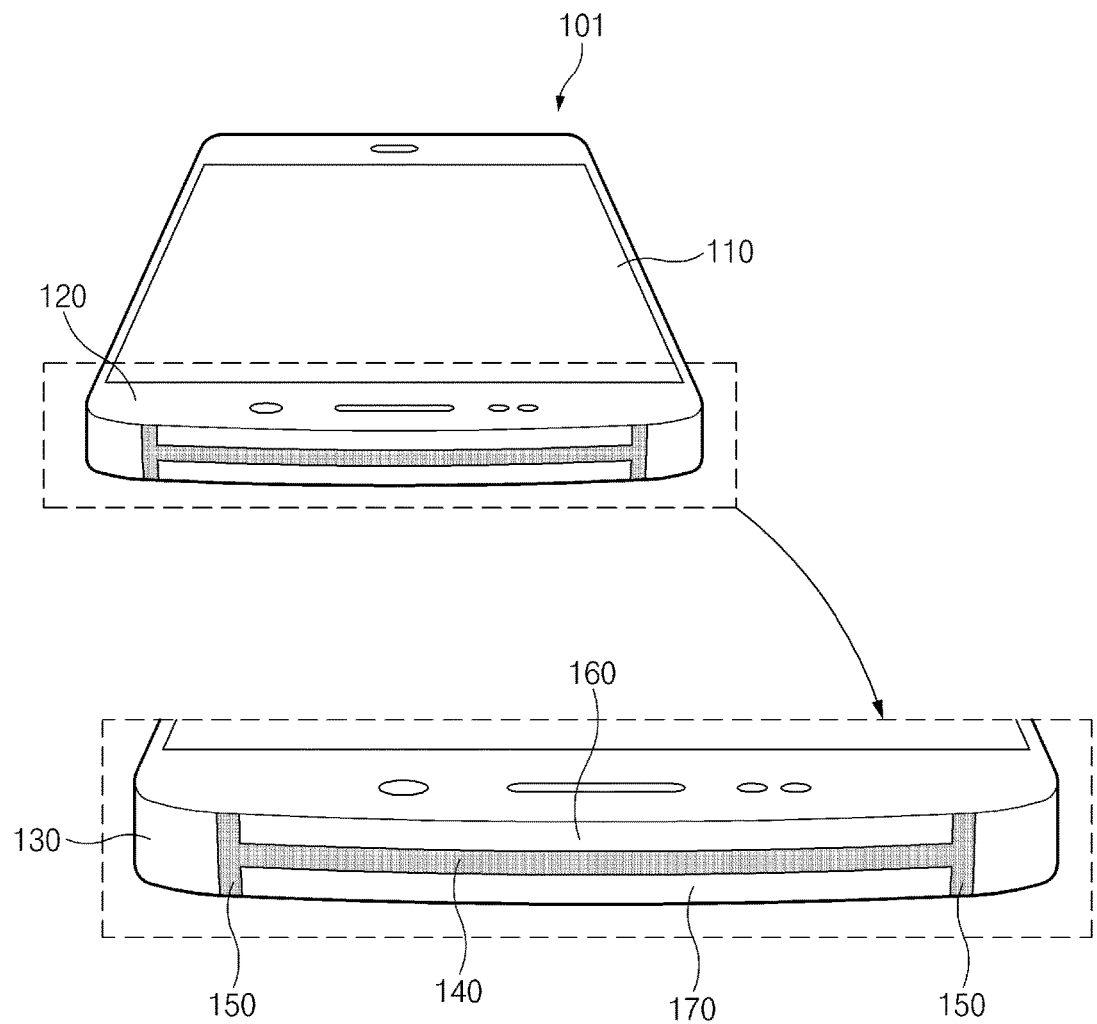
FIGS. 1A and 1B are diagrams illustrating an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

A multiband antenna and an electronic device including the same will be described with reference to the accompanying drawings. The term "user" as used herein may refer to a person who uses an electronic device or may refer to a device (e.g., an artificial intelligence electronic device) that uses an electronic device.

Figure 1B:
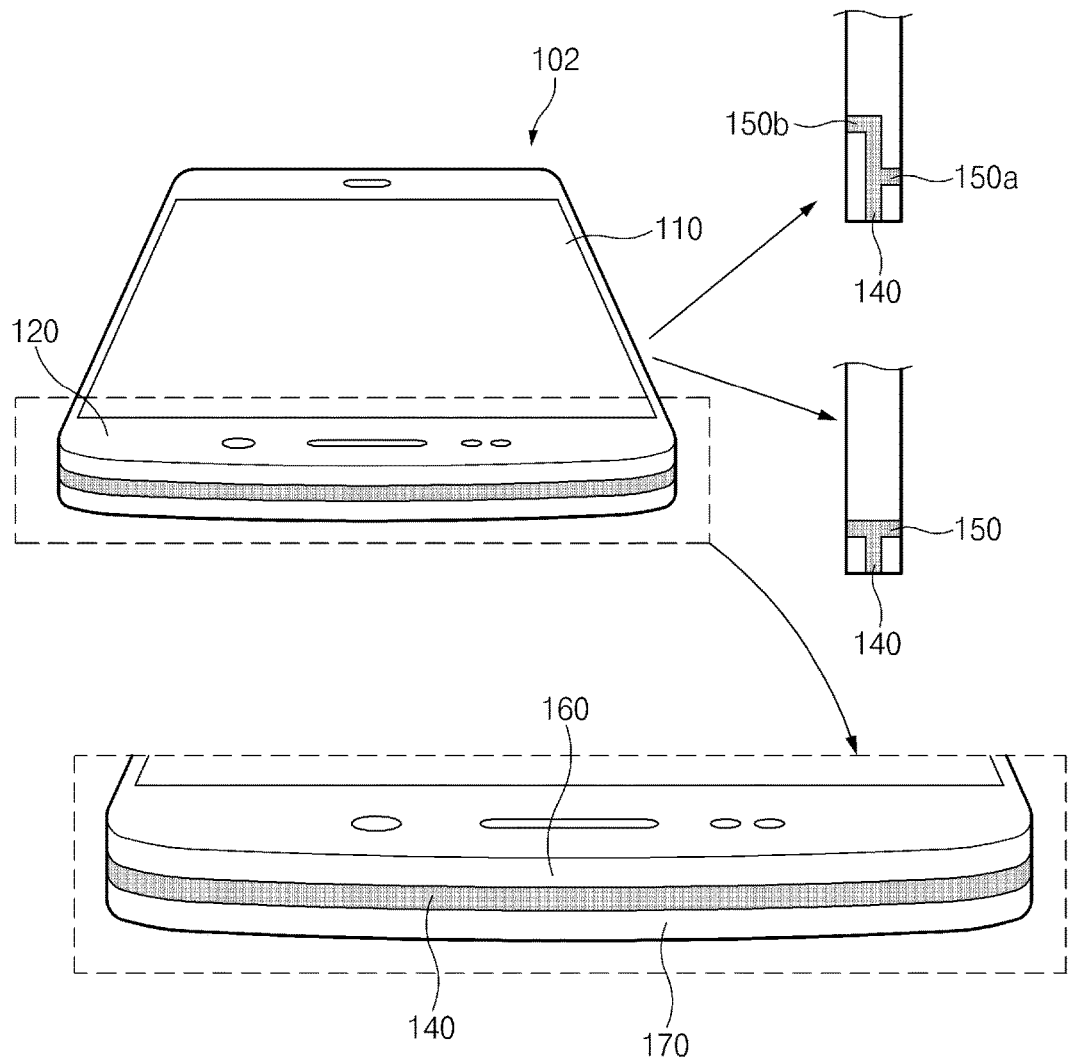

FIGS. 1A and 1B are diagrams illustrating an electronic device, according to an embodiment of the present disclosure.

Referring to FIG. 1A, the electronic device 101 may be a device such as a smartphone or a tablet PC, and may transmit and receive data through various communication schemes such as long distance communication (for example, mobile communication such as voice communication or wireless data communication), short range communication (for example, Bluetooth communication or wireless fidelity (Wi-Fi) communication), or an ultra-short range communication (for example, wireless payment, wireless charging, or near field communication (NFC)). The electronic device 101 may employ various antennas for executing the communication schemes.

The electronic device 101 includes a display 110 and a body (or housing) 120.

The display (or a window including the display) 110 may output various content that is provided for the user, and may receive an input of the user through a touch input.

The display 110 and various internal circuits may be mounted on the body 120, which protects the display 110 and the internal circuits. Moreover, peripheral buttons may be mounted on the body 120, and various other devices, such as processors, modules, sensors, antennas, and circuit boards, which are components of the electronic device 101 may be mounted on the body 120. The body 120 may be integrally formed as one housing.

At least a portion of a side frame 130 of the body 120 may be formed of a conductive member (for example, a metal frame), which may be utilized as an antenna radiator. A power feeding part, a ground part, or the like may be connected to the conductive member and may be connected to a printed circuit board (PCB) and circuits in the interior of the body 120.

Although an upper end side of the side frame 130 of the electronic device 101 is utilized as an antenna for various wireless communication which will be mainly discussed, the present disclosure is not so limited.

The side frame 130 may include at least one first nonconductive member (a transverse partition part) 140 that extends in a direction parallel to the front surface (a surface on which the display 110 is disposed) or the rear surface of the electronic device 101. The side frame 130 may be partitioned into a first radiator part 160 (first radiator 160) that is disposed adjacent to the front surface of the electronic device 101 and a second radiator part 170 (second radiator 170) that is disposed adjacent to the rear surface (a surface on which a rear cover or a battery cover is disposed) of the electronic device 101, through the transverse partition part 140.

The electronic device 101 includes at least one second nonconductive member (a longitudinal partition part) 150 that extends in a longitudinal direction (a direction perpendicular to a surface of the display 110). All the four side surfaces of the side frame 130 may be utilized as antennas, or an area partitioned by the longitudinal partition part may be utilized as an antenna radiator. Although it is illustrated in FIG. 1A that the upper end side surface of the electronic device 101 is partitioned into a first radiator 160 and a second radiator 170 through the transverse partition part 140 and the longitudinal partition parts 150, the present disclosure is not so limited.

The first radiator 160 and the second radiator 170 may have various forms based on the locations, the lengths, or the thicknesses of the transverse partition part 140 or the longitudinal partition parts 150, and may transmit and receive signals of various frequency bands based on the various forms.

The transverse partition part 140 or the longitudinal partition parts 150 may be formed of an insulating material for isolating the first radiator 160 and the second radiator 170. The transverse partition part 140 or the longitudinal partition parts 150 may be formed by partially expanding the housing in the interior of the electronic device 101 or through an insulator separately attached to the outside of the housing.

The first radiator 160 and the second radiator 170 may be connected to each other to act as one antenna or may act as separate antennas to transmit and receive signals of different frequency bands.

Referring to FIG. 1B, unlike the electronic device 101 of FIG. 1A, the electronic device 102 may include a transverse partition part 140, a first radiator 160, and a second radiator 170 on an upper end side surface thereof and may include longitudinal partition parts 150 on each of left and right side surfaces thereof. Through this, the transverse partition part 140, the first radiator 160, and the second radiator 170 may extend to the left and right side surfaces of the electronic device 102.

The longitudinal partition parts 150 may include a first longitudinal partition part 150a and a second longitudinal partition part 150b. For example, on each of the side surfaces of the electronic device 102, the first longitudinal partition part 150a may be connected to an intermediate portion of the transverse partition part 140, and the second longitudinal partition part 150b may be connected to an end of the transverse partition part 140. The entire lengths of the first radiator 160 and the second radiator 170 may be different from each other. Although it is illustrated in FIG. 1B that the first radiator 160 is longer than the second radiator 170, the present invention is not so limited.

Figure 2A:
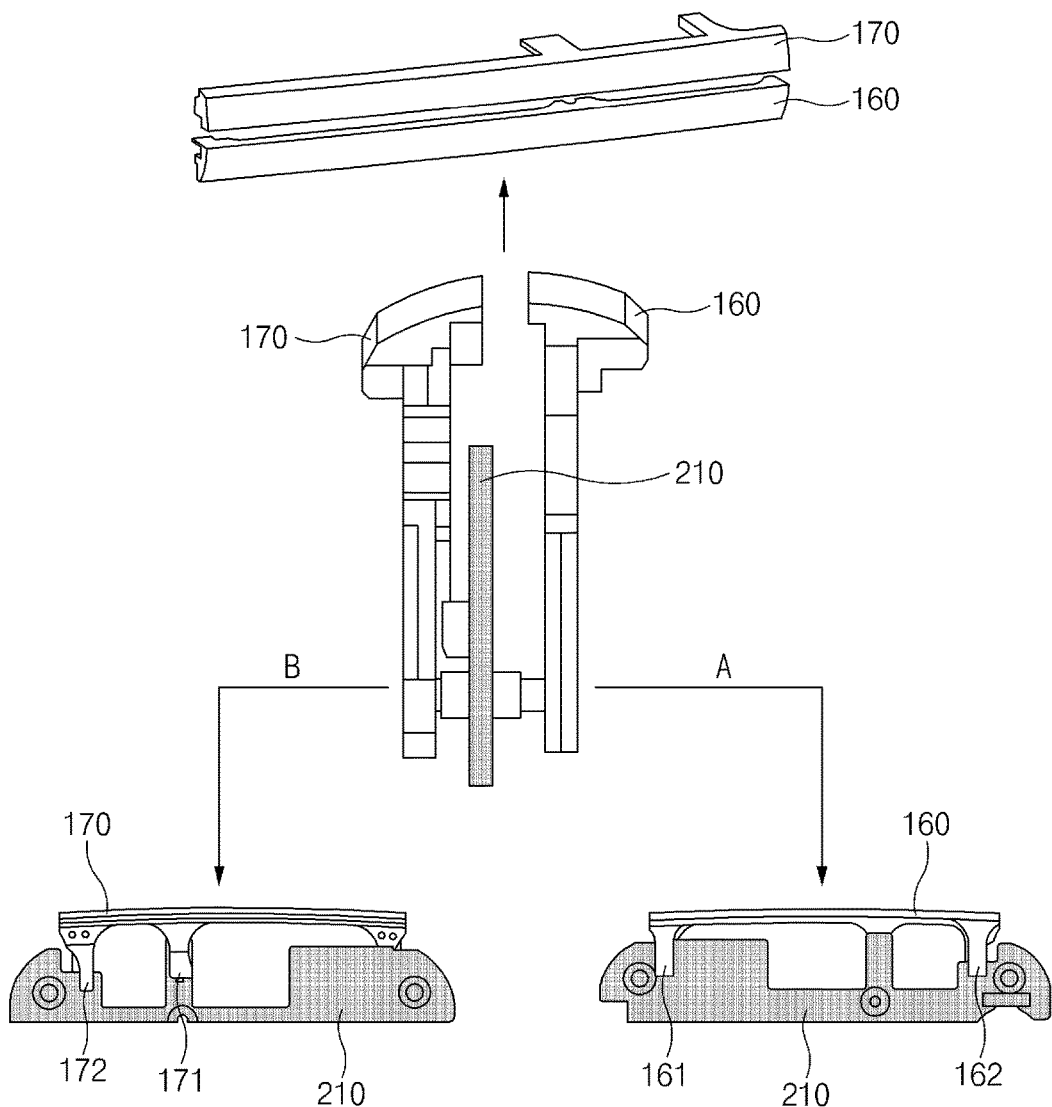
FIG. 2A is a diagram illustrating a first radiator part and a second radiator part that are partitioned by a transverse partition part, according to an embodiment of the present disclosure.
Figure 2B:
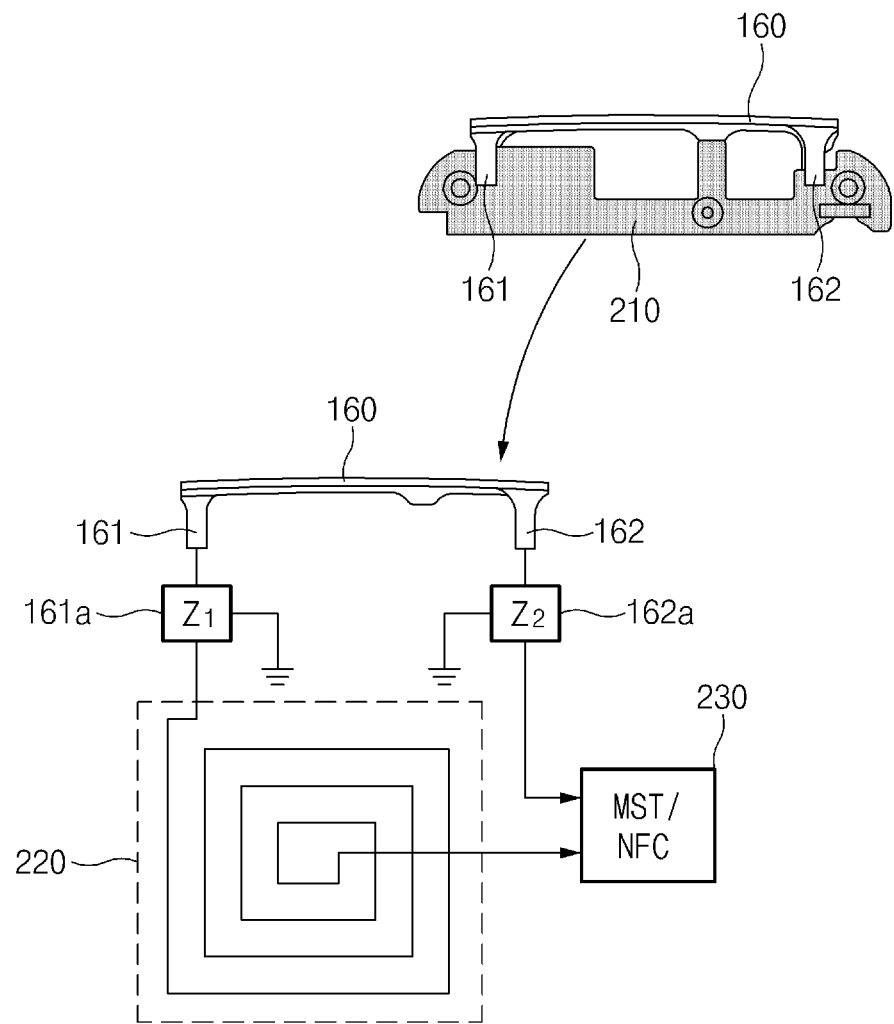
FIG. 2B is a diagram of the first radiator part, according to an embodiment of the present disclosure.

FIG. 2A is a diagram illustrating a first radiator part and a second radiator part that are partitioned by a transverse partition part, according to an embodiment of the present disclosure, and FIG. 2B is a diagram of the first radiator part, according to an embodiment of the present disclosure. The forms of the first and second radiators, and the connection locations of a power feeding part or a ground part illustrated in these FIGs. are merely examples, and the present invention is not so limited.

Referring to FIG. 2A, the first radiator 160 and the second radiator 170 may be partitioned by the transverse partition part 140. The first radiator 160 and the second radiator 170 may be connected to a PCB 210 in the interior of the electronic device 101. The first radiator 160 and the second radiator 170 may be connected to a power source, the ground, internal circuits (for example, a payment circuit), or the like through the PCB 210.

The first radiator 160 may transmit and receive a signal of a first frequency band, and the second radiator 170 may transmit and receive a signal of a second frequency band that is different from the first frequency band by a designated frequency value.

For example, the first radiator 160 may be set to transmit signals of a low frequency band (for example, a band of 1 KHz to 100 MHz) for short range communication or communication for a contact type wireless payment, and the second radiator 170 may be set to transmit and receive signals of a high frequency band (for example, a band of 700 MHz to 900 MHz) for cellular communication.

When the first radiator 160 and the second radiator 170 transmit and receive signals of frequency bands that are different from each other by a designated frequency value, an interference between the signals pertaining to the bands can be reduced.

When the PCB 210 is viewed from the front side (direction A) of the electronic device 101, the first radiator 160 and the board 210 may be visible. The first radiator 160 may be connected to a circuit in the interior of the electronic device 101 through the PCB 210. The first radiator 160 may be utilized as a radiator of an antenna for short range communication or an antenna for wireless payment. The first radiator 160 may be connected to two ground parts 161 and 162. The first radiator 160 constitutes at least a part of a loop structure to form an inductance, and may have a resonance frequency of a low frequency band (for example, a band of 1 KHz to 100 MHz).

When the PCB 210 is viewed from the rear side (direction B) of the electronic device 101, the second radiator 170 and the board 210 may be visible. The second radiator 170 may constitute a monopole antenna or an inverse F-type antenna for cellular communication, and may have at least one resonance frequency. In the case of an inverse F-type antenna, the second radiator 170 may be connected to a power feeding part 171 and a ground part 172. The second radiator 170 may be connected to a wireless communication module in the interior of the electronic device 101 through the board 210.

Referring to FIG. 2B, the first radiator 160 may be utilized as part of a radiator of an antenna for short range communication or an antenna for wireless payment.

The first ground part 161 and the second ground part 162 may be connected to circuits in the interior of the electronic device 102 through connection parts 161a and 162a, respectively.

The connection parts 161a and 162a may perform switching functions, respectively. The connection parts 161a and 162a may be connected to different ports based on a frequency band corresponding to the first radiator 160.

For example, when a high frequency signal is received by using the first radiator 160, the connection parts 161a and 162a may be connected to the ground so that the entire length of the radiator is decreased. In contrast, when a low frequency signal is received by using the first radiator 160, the connection parts 161a and 162a may connect the first radiator 160 to a rear radiator 220 in the interior of the electronic device 102 so that the entire length of the radiator is increased.

A communication circuit 230 may transmit and receive signals of different frequency bands as the lengths of the first radiator 160 and the rear radiator 220 are decreased or increased. The connection parts 161a and 162a may be switching circuits including an inductor or a capacitor.

Figure 3A:
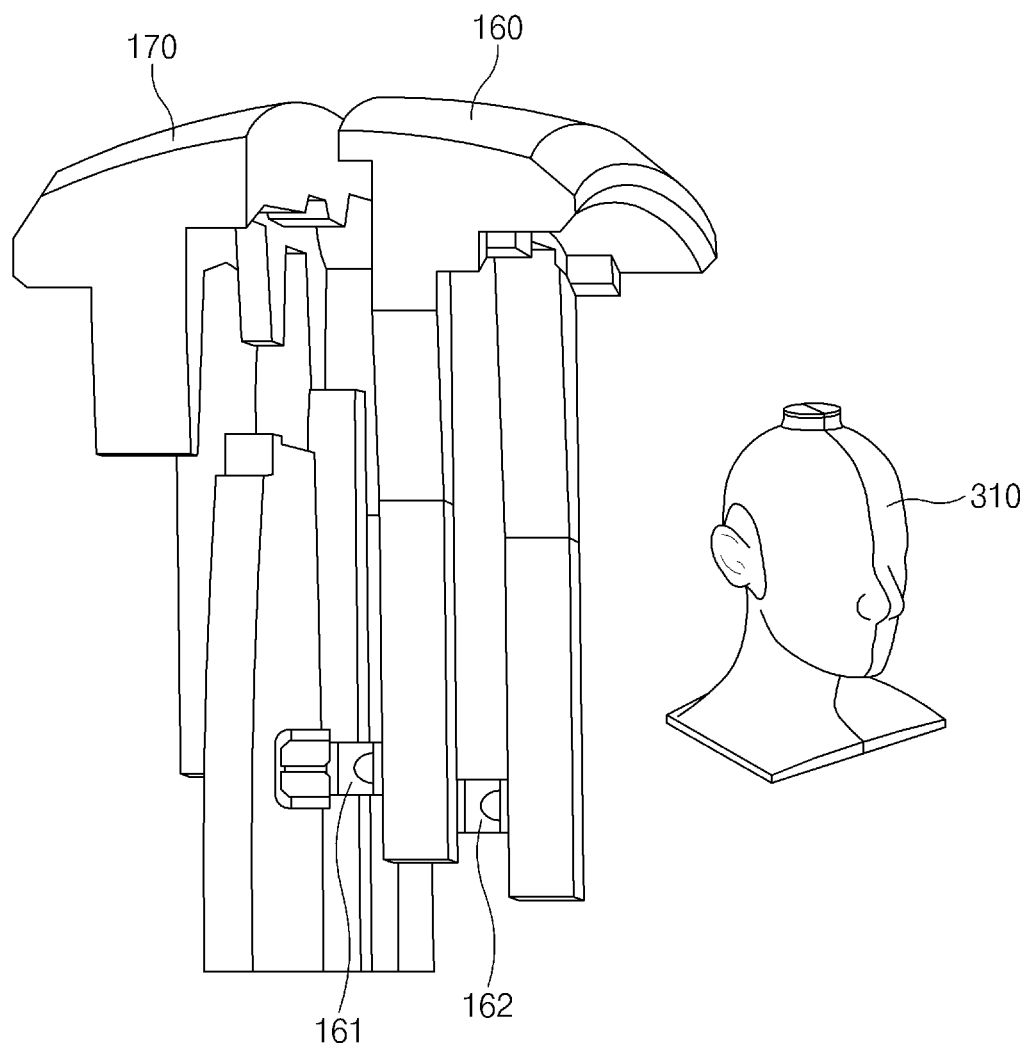
FIG. 3A is a diagram illustrating a side frame of the first radiator part and the second radiator part, according to an embodiment of the present disclosure.
Figure 3B:
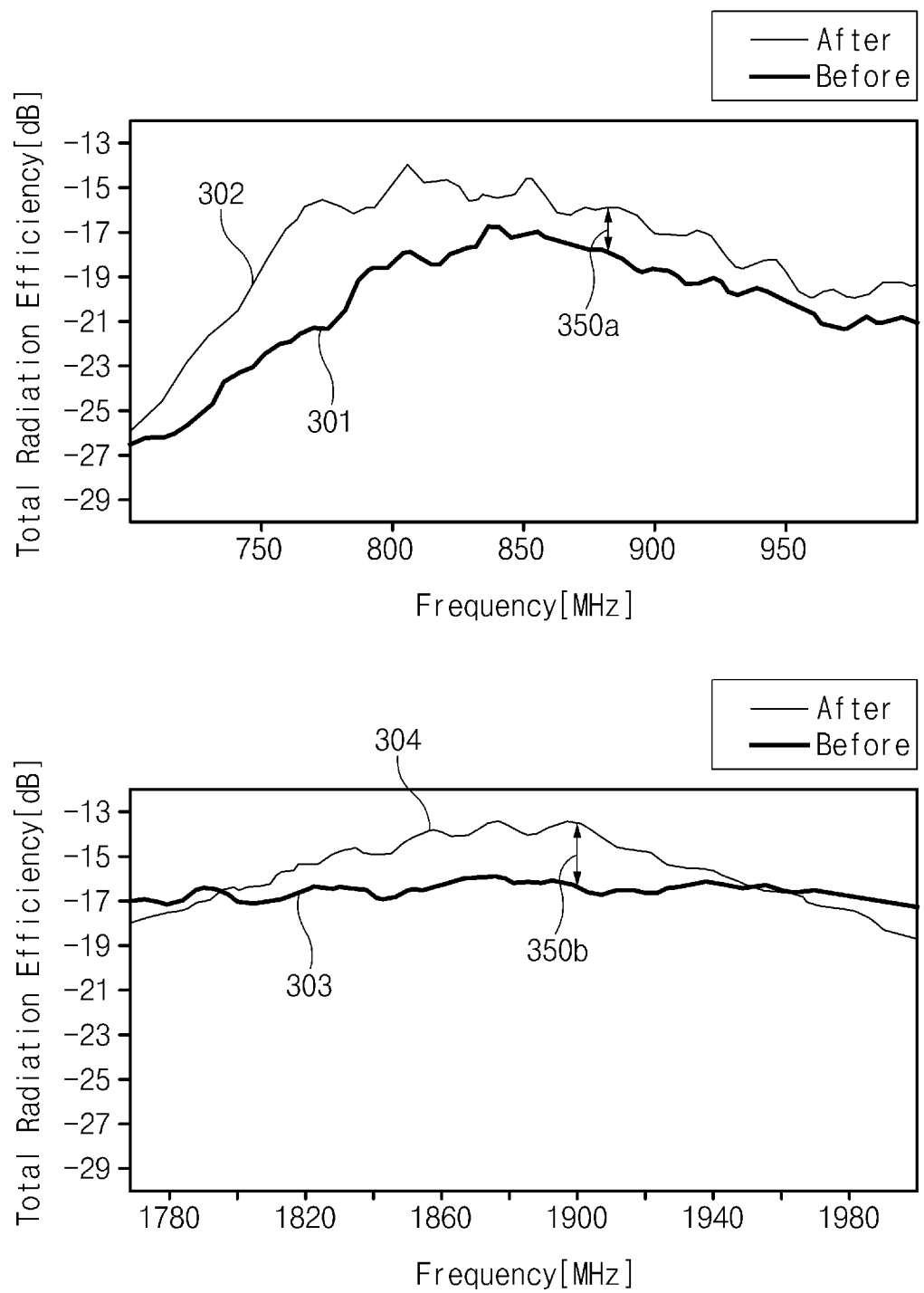
FIG. 3B is a graph of, total radiation efficiency vs. frequency, according to an embodiment of the present disclosure.

FIG. 3A is a diagram illustrating a side frame of a first radiator 160 and a second radiator 170 according to an embodiment of the present disclosure, and FIG. 3B is a graph of total radiation efficiency vs. frequency, according to an embodiment of the present disclosure.

Referring to FIG. 3A, when a side frame (for example, an upper end frame) of an electronic device acts as an antenna radiator, the radiation performance of the antenna may be lowered while a hand or the head of the user makes contact with the side frame. In the case of the cellular communication such as a voice communication, if the user grips the electronic device or locates the electronic device close to his or her head, communication quality or data transmission/reception performance may be lowered due to deterioration of radiation performance. Further, when the antenna for cellular communication is situated close to a part of the human body (for example, a hand or the head of the user), the user may be negatively influenced by electromagnetic waves irradiated from the antenna.

The antenna (for example, the antenna that uses the second radiator 170) for cellular communication may be disposed more distant than the antenna (for example, the antenna that uses the first radiator 160) for short range communication (for example, wireless payment) from the user 310. For example, the second radiator 170 for cellular communication may be disposed close to the rear surface, on which a rear cover or a battery cover is disposed, of the electronic device 101 through the transverse partition part 140, and the first radiator 160 for a wireless payment may be disposed adjacent to the front surface, on which a display is disposed of the electronic device 101.

The second radiator 170 may be disposed close to the rear side of the electronic device 101 through the transverse partition part 140, and a distance between the second radiator 170 and the user 310 may become large in a voice communication state or a cellular communication state. Deterioration of radiation performance that is caused by a contact with the head of the user 310 can be prevented, and the amount of electromagnetic waves that influence the user 310 also may be decreased.

Referring to FIG. 3B, radiation efficiency is increased if the side frame 130 is partitioned by the transverse partition part 140 (graph 302 or graph 304), as opposed to a case in which the upper end frame 130 of the electronic device 101 is not partitioned by the transverse partition part 140 (or a case in which the radiator for cellular communication is disposed on the entire upper ends of the side surfaces), see graph 301 or graph 303, for example.

For example, in a GSM 850 band, communication efficiency can be improved (the width 350a) by about 2 dB through the transverse partition part 140 and in another band, it may be improved (the width 350b) by a maximum of 4 dB.

Figure 4:
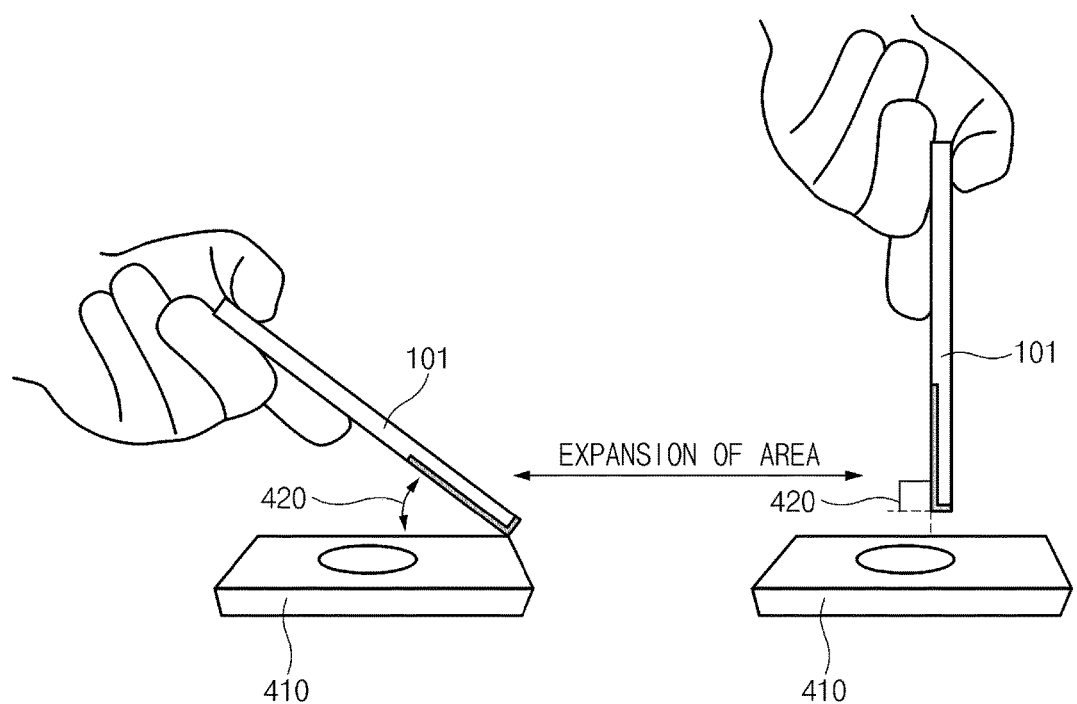
FIG. 4 is a diagram illustrating a short range communication using an electronic device, according to an embodiment of the present disclosure.

FIG. 4 is a diagram illustrating a short range communication using an electronic device, according to an embodiment of the present disclosure.

Referring to FIG. 4, when the electronic device 101 includes an antenna (for example, the antenna that uses the first radiator 160) for short range communication (for example, a wireless payment) and a communication circuit that processes signals received through the antenna, the user may perform a short range communication by using the electronic device 101.

If the user brings the electronic device 101 into contact with an external device (for example, a payment device) 410 or disposes the electronic device 101 close to the external device 410, an antenna (for example, the antenna that uses the first radiator 160) for short range communication of the electronic device 101 may transmit and receive signals for recognizing the external device 410. For example, the electronic device 101 may exchange information for wireless payment (for example, a card number or a payment sum) with the external device 410 through a channel formed between the electronic device 101 and the external device 410.

A radiation area (an area in which the external device 410 recognizes the electronic device 101) through an antenna of the electronic device 101 may extend to an upper end side area (for example, an area in which the first radiator 160 is disposed) of the electronic device 101 as well as the rear surface of the electronic device 101. For example, the first radiator 160 may be partitioned from the second radiator 170 for cellular communication through the transverse partition part 140 at upper ends of the side surfaces of the electronic device 101.

In the case of a conventional wireless payment technology, a payment antenna is disposed in the interior of an electronic device, which requires an additional pattern for improving recognition rate. Even when an addition pattern is provided, because the radiation area of the antenna is limited to a rear area of the electronic device, the rear surface of the electronic device needs to be brought into contact with a payment device at an angle of less than about 60 degrees when the electronic device makes contact with the payment device.

Meanwhile, in the electronic device 101, a radiator (for example, the first radiator 160) of a short range communication antenna may be exposed to the outside through the transverse partition part 140 and the electronic device 101 may easily make contact with the external device 410. The external device 410 may recognize a signal transmitted through the short range communication antenna of the electronic device 101 at a relatively high recognition rate. When the first radiator 160 is disposed at an upper end of the electronic device 101, a short range communication may be performed even when the electronic device 101 makes contact with the external device 410 at the right angle (90 degrees). Further, even when the angle between the electronic device 101 and the payment device is changed within an angle of 0 to 90 degrees, the external device 410 may perform a wireless communication.

Figure 5A:
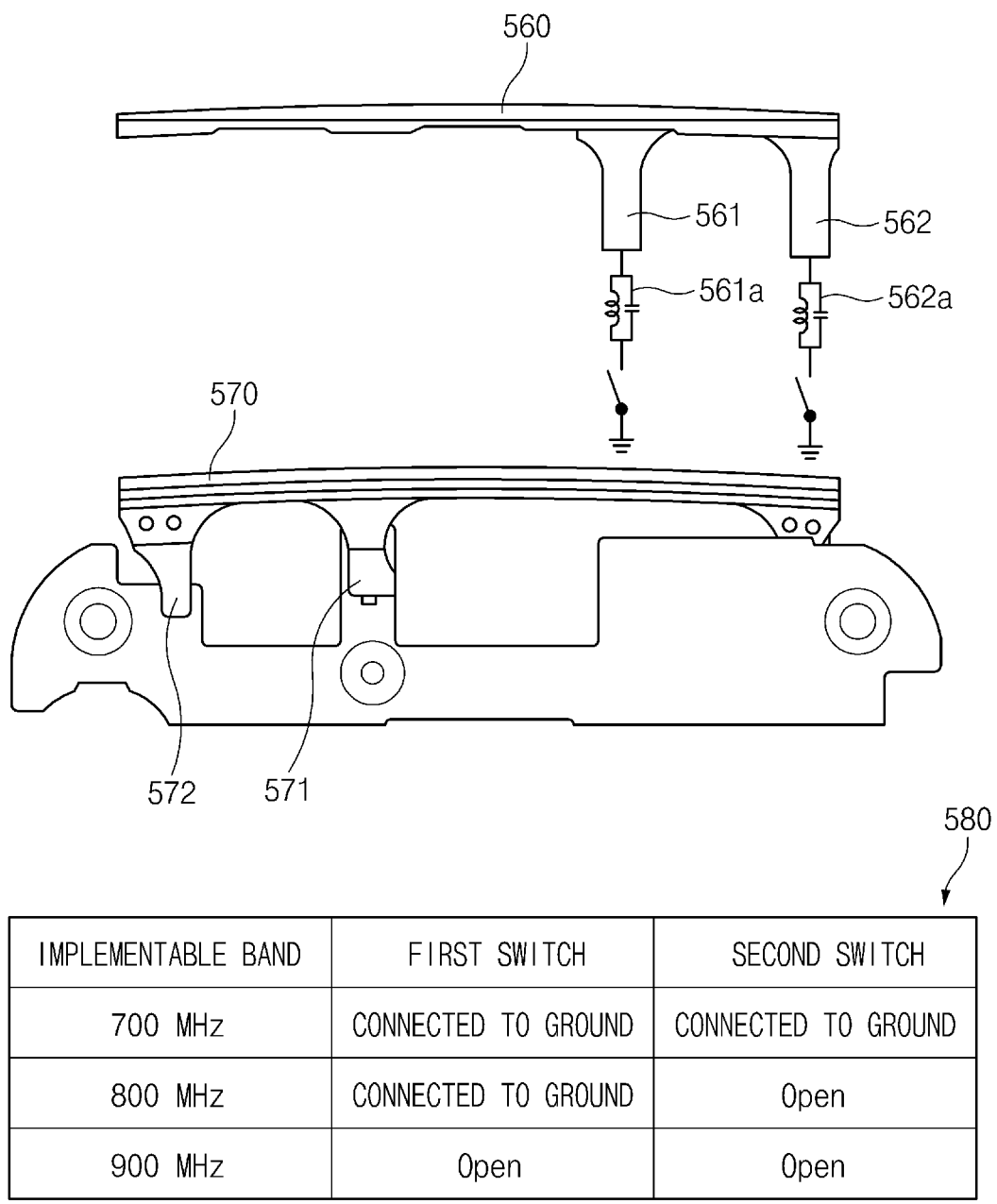
FIG. 5A is a diagram illustrating a side frame of the electronic device shown partitioned into a first radiator part and a second radiator part, according to an embodiment of the present disclosure.
Figure 5B:
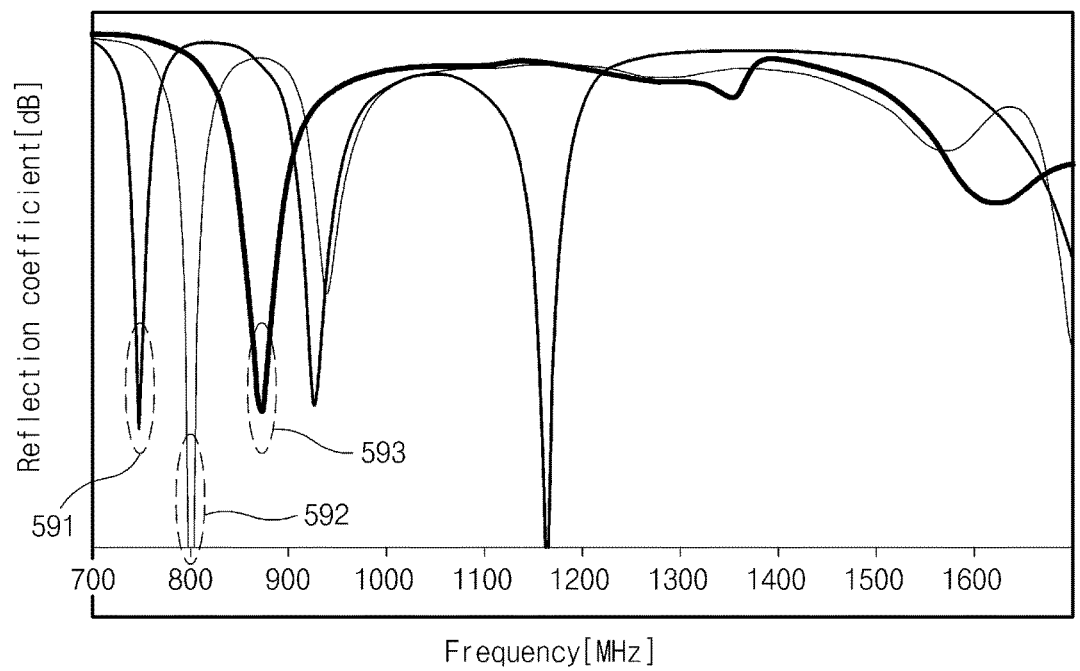
FIG. 5B is a graph of a reflection coefficient vs. frequency, according to an embodiment of the present disclosure.

FIG. 5A is a diagram illustrating a side frame of the electronic device 101 shown partitioned into a first radiator 560 and a second radiator 570, according to an embodiment of the present disclosure, and FIG. 5B is a graph of a reflection coefficient vs. frequency, according to an embodiment of the present disclosure.

Referring to FIG. 5A, the side frame 130 of the electronic device 101 may be partitioned into a first radiator 560 and a second radiator 570 by the transverse partition part 140. The first radiator and the second radiator 560 and 570, respectively, may be operated through a coupling power feeding scheme, and may act as one antenna that transmits and receives signals of designated frequency bands.

The first radiator 560 may have at least one ground part (for example, a first ground part 561 and a second ground part 562).

The first ground part and the second ground part 561 and 562, respectively, may be connected to the ground in the interior of the electronic device 101 through a first switch 561*a* and a second switch 562*a*, respectively. The first switch and the second switch 561*a* and 562*a* may be controlled through a circuit in the interior of the electronic device 101. The electronic device 101 may select a frequency band, signals of which the electronic device 101 will receive, by controlling the first switch 561*a* and the second switch 562*a*. The first switch 561*a* and the second switch 562*a* may be implemented by an inductor and a capacitor, respectively.

The second radiator 570 may be connected to a power feeding part 571 and a ground part 572 to constitute an inverse F-type antenna. The second radiator 570 may provide electric power for the first radiator 560 through a coupling scheme.

The first switch 561*a* and second switch 562*a* may change the frequency bands, signals of which are received through the first radiator 560 and the second radiator 570 as the first switch 561*a* and second switch 562*a* are opened and closed.

A table 580 illustrates signals of 700 MHz to 900 MHz that are received by using the first radiator 560 and the second radiator 570.

Referring to the table 580, the electronic device 101 may receive signals of a band of 700 MHz to 900 MHz by switching the first switch 561*a* and the second switch 562*a*.

When both of the first switches 561*a* and the second switch 562*a* are connected to the ground, the first radiator 560 and the second radiator 570 may receive signals of a band of 700 MHz.

When the first switch 561*a* is connected to the ground and the second switch 562*a* is opened, the first radiator 560 and the second radiator 570 may receive signals of a band of 800 MHz.

When both of the first switch 561*a* and the second switch 562*a* are opened, the first radiator 560 and the second radiator 570 may receive signals of a band of 900 MHz.

Referring to FIG. 5B, when both of the first switch 561*a* and the second switch 562*a* are connected to the ground, a reflection coefficient may be smallest at a band of 700 MHz (graph 591) and the first radiator 560 and the second radiator 570 may transmit and receive signals of a band of 700 MHz.

When the first switch 561*a* is connected to the ground and the second switch 562*a* is opened, the first radiator 560 and the second radiator 570 may transmit and receive signals of a band of 800 MHz (graph 592).

When both of the first switch 561*a* and the second switch 562*a* are opened, the first radiator 560 and the second radiator 570 may receive signals of a band of 900 MHz (graph 593).

Figure 6:
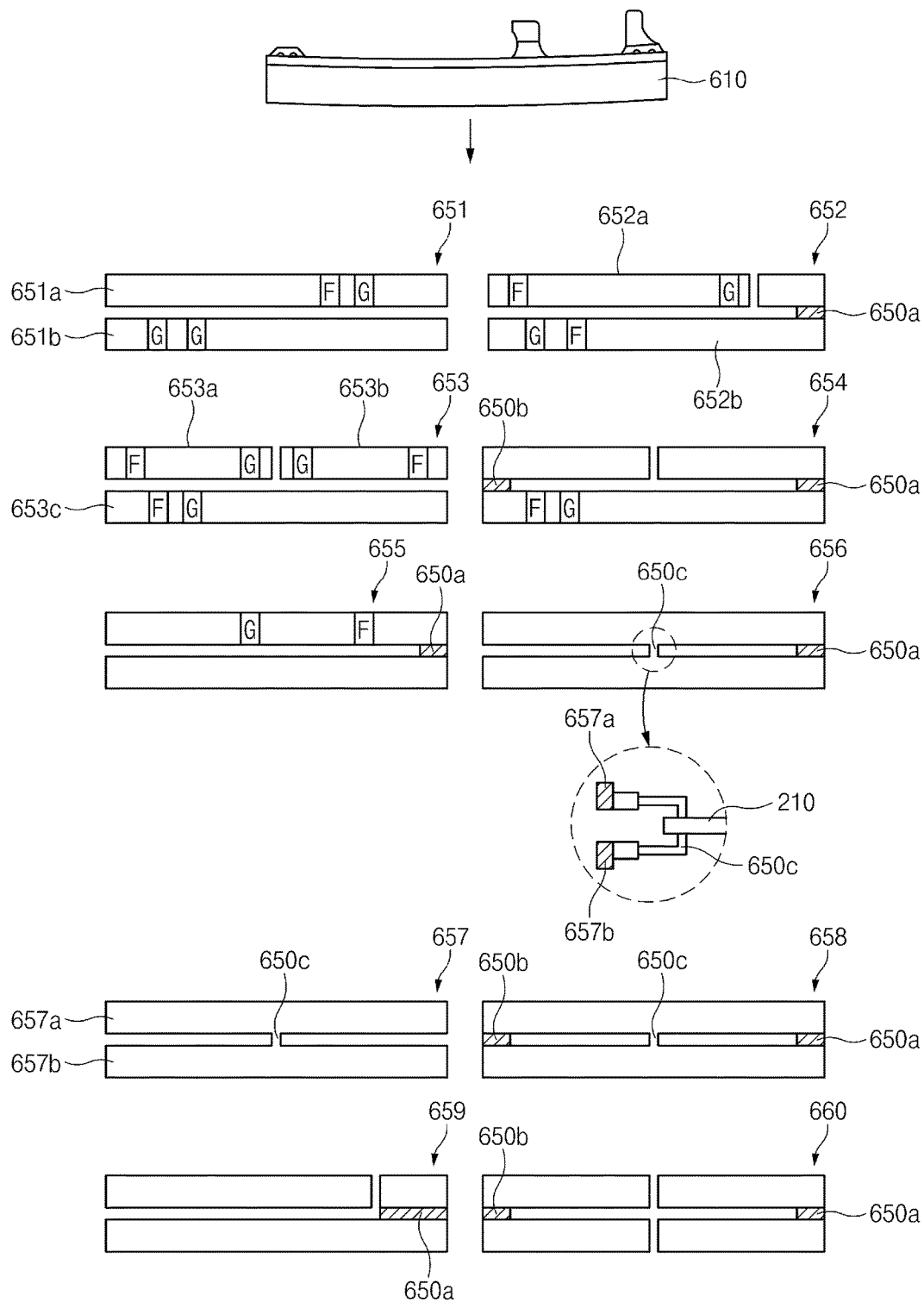
FIG. 6 is a diagram of a side frame that is modified by using a transverse partition part or a longitudinal partition part, according to an embodiment of the present disclosure.

FIG. 6 is a diagram of a side frame that is modified by using a transverse partition part or a longitudinal partition part, according to an embodiment of the present disclosure.

Referring to FIG. 6, the side frame 610 of the electronic device 101 may be modified into a form of the radiator 651 to radiator 660 through the transverse partition part or the longitudinal partition part. The side frame 610 may further include connection parts 650*a* to 650*c* that connect the radiators at an upper end and a lower end thereof. The connection parts 650*a* to 650*c* may physically or electrically connect the radiators at the opposite ends.

In the radiator 651, the side frame 610 may include one transverse partition part that separates the entire part of the side frame 610, and the radiator 651 may be partitioned into a first radiator 651*a* and a second radiator 651*b* by the transverse partition part. For example, the first radiator 651*a* and the second radiator 651*b* may act as separate antennas. The first radiator 651*a* may act as an inverse F-type antenna that has one power feeding part and one ground part. Meanwhile, the second radiator 651*b* may have two ground parts, and may be utilized as an antenna for a short range communication (for example, a wireless payment).

In the radiator 652, the side frame 610 may include one transverse partition part and one longitudinal partition part. The transverse partition part may have a form in which one side of the side frame 610 is completely partitioned but an opposite side thereof is not partitioned. The longitudinal partition part may be disposed at an upper end of the transverse partition part. Upper and lower ends of the second radiator 652*b* may be connected to each other through a connection part 650*a*. Unlike the radiator 651, in the radiator 652, the first radiator 652*a* may be shorter than the second radiator 652*b*. Each of the radiators may include one power feeding part and one ground part, and may act as separate antennas.

In the radiator 653, the side frame 610 may include one transverse partition part and one longitudinal partition part.

The transverse partition part separates the entire part of the side frame 610 and the longitudinal partition part may be disposed at an upper end of the transverse partition part. The radiator 653 may be partitioned into first to third radiators 653a to 653c by the partition parts. Each of the radiators may include one power feeding part and one ground part, and may act as separate antennas. For example, the antennas may receive signals of adjacent frequency bands based on the forms or lengths thereof.

In the radiator 654, the side frame 610 may include one transverse partition part and one longitudinal partition part. The transverse partition part may not partition opposite ends of the side frame 610 but partition only a central portion of the side frame 610, and the longitudinal partition part may be disposed at an upper end of the transverse partition part. Connection parts 650a and 650b may connect an upper end and a lower end of the side frame 610 at opposite ends of the transverse partition part. The partition parts may be configured such that the radiator 654 acts as one radiator, while not being partitioned. The radiator 654 may include one power feeding part and one ground part, and may act as one antenna.

In the radiator 655, the side frame 610 may include one transverse partition part. The transverse partition part may have a form in which one side of the side frame 610 is completely partitioned but an opposite side thereof is not partitioned. The connection part 650a may connect an upper end and a lower end of the side frame 610 at an end of the transverse partition part. The radiator 655 may include one power feeding part and one ground part, and may act as one antenna.

In the radiators 656 to 658, the side frame 610 may include a central connection part 650c that is distinguished from the connection parts 650a and 650b. Unlike the connection parts 650a and 650b, the central connection part 650c may be inserted (or disposed) into the electronic device.

In the radiators 659 and 660, the location or form of the transverse partition part or the longitudinal partition part may be changed, and if the location, the length, or the thickness of the connection part 650a or 650b is changed, the form of the side frame 610 may be changed accordingly.

FIG. 6 shows examples of the side frame 610, and the form of the side frame 610 is not so limited. For example, if the locations, the number, or the form of the transverse partition parts or the longitudinal partition parts are changed, the side frame 610 may be changed accordingly. Furthermore, the radiators may be connected to feeding parts and ground parts at various locations, and may transmit and receive signals of a designated frequency band according to the locations of the feeding parts and the ground parts.

Figure 7A:
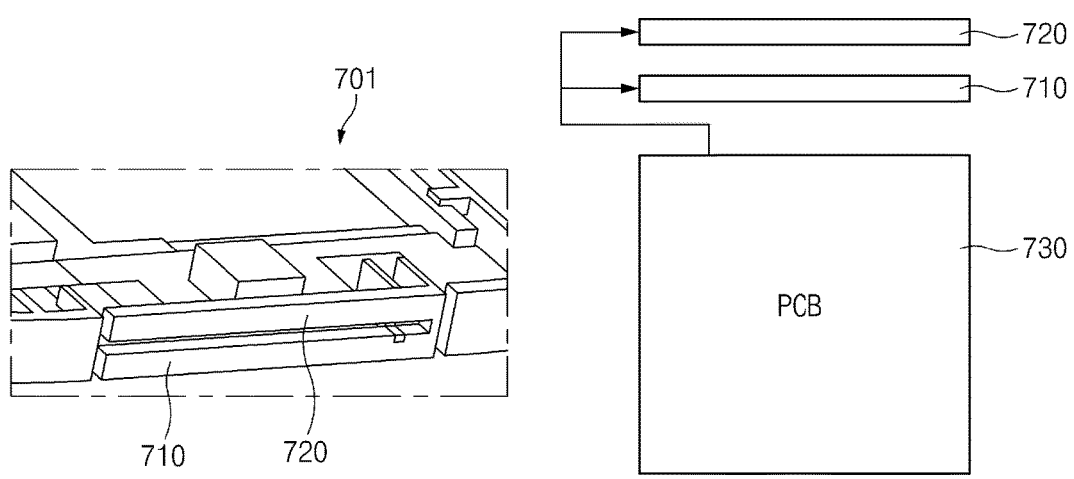
FIG. 7A is a diagram illustrating a dual resonance antenna through a transverse partition part, according to an embodiment of the present disclosure.
Figure 7B:
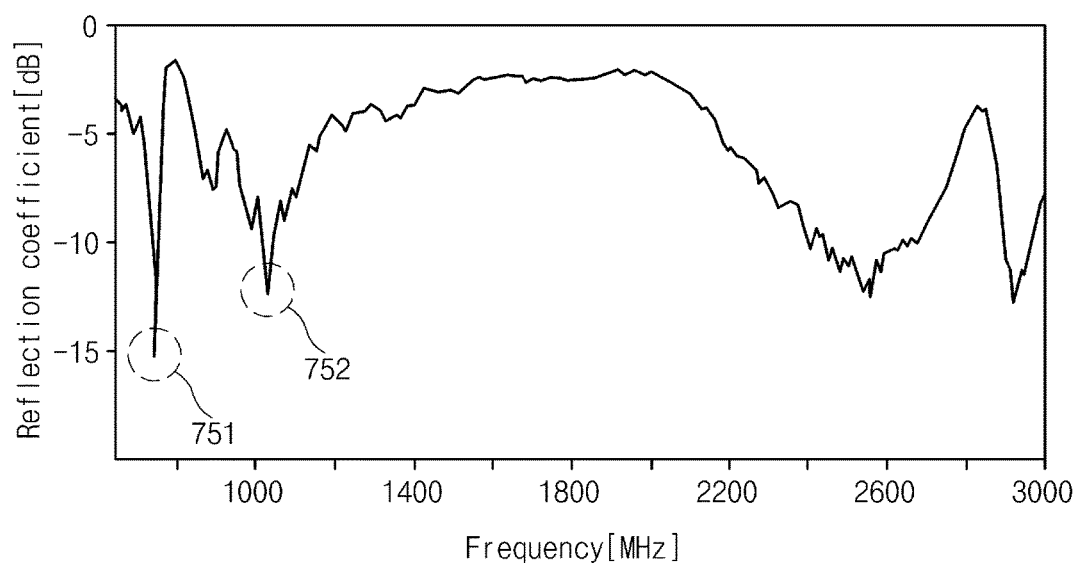
FIG. 7B is a graph of a reflection coefficient vs. frequency, according to an embodiment of the present disclosure.

FIG. 7A is a diagram illustrating a dual resonance antenna implemented through a transverse partition part, according to an embodiment of the present disclosure, and FIG. 7B is a graph of a reflection coefficient vs. frequency, according to an embodiment of the present disclosure.

Referring to FIG. 7A, the side frame 130 of the electronic device 701 may be partitioned into a first radiator 710 and a second radiator 720 by the transverse partition part. The first radiator 710 and the second radiator 720 may have similar forms, and may receive the same power signal through a board in the interior of the electronic device 701 and may transmit and receive signals of the same or adjacent frequency bands, respectively.

The first radiator 710 and the second radiator 720 may receive electric power at the same or similar locations from the board (PCB) 730, and may be connected to the ground at the same or similar locations. The first radiator 710 and the second radiator 720 may perform a wide band communication through a dual resonance scheme.

Referring to FIG. 7B, the first radiator 710 may transmit and receive signals of a band of 700 MHz (a graph 751), and the second radiator 720 may transmit and receive signals of a band of 1000 MHz (a graph 752).

The first radiator 710 and the second radiator 720 may transmit and receive frequency signals of the same band or adjacent bands, and may adjust the frequency bands, of which signals are received by the radiators by adjusting the location or form of the transverse partition part. The electronic device 701 may receive signals of a bandwidth wider than that of the antenna that receives a signal through one radiator without using a transverse partition part.

Figure 8A:
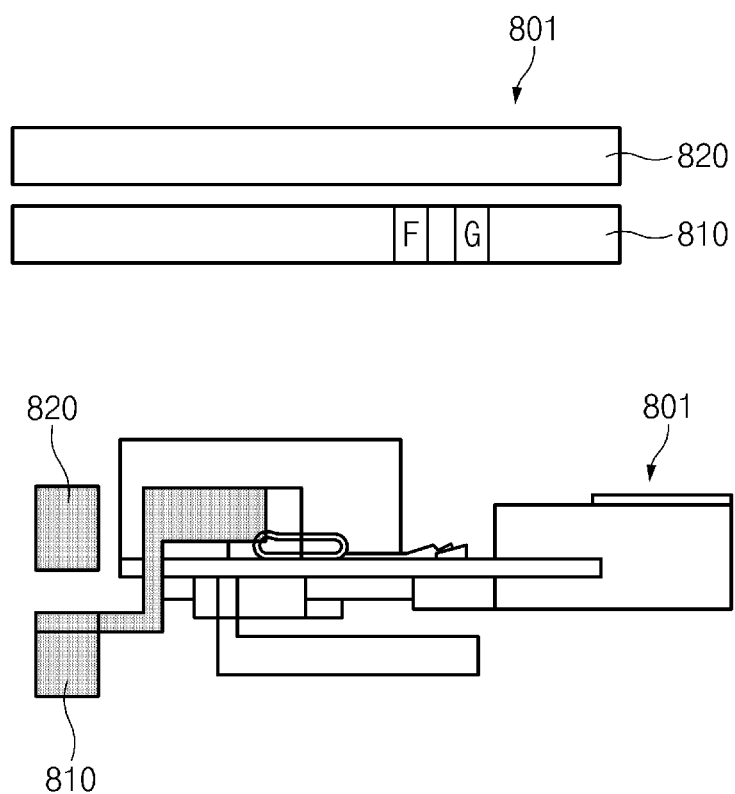
FIG. 8A is a diagram illustrating a floating metal that is formed through a transverse partition part, according to an embodiment of the present disclosure.
Figure 8B:
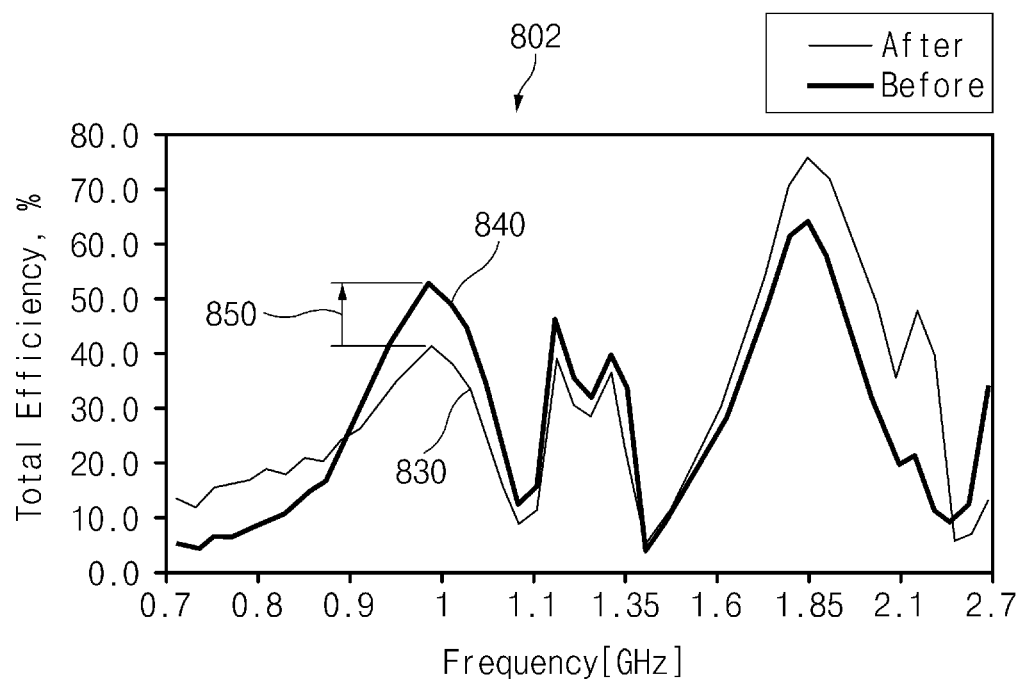
FIG. 8B is a graph illustrating total efficiency vs. frequency, according to an embodiment of the present disclosure.

FIG. 8A is a diagram illustrating a floating metal that is formed through a transverse partition part, according to an embodiment of the present disclosure, and FIG. 8B is a graph illustrating total efficiency vs. frequency, according to an embodiment of the present disclosure.

Referring to FIG. 8A, the side frame of the electronic device 801 may be partitioned into a radiator 810 and a floating metal 820 (for example, steel, or copper) by a transverse partition part.

The radiator 810 may include a power feeding part and a ground part, and may transmit and receive signals of a designated frequency band. The radiator 810 needs to be spaced apart at a predefined distance from an internal metallic object (for example, a component such as OCTA, BRK, PCB GND, or IF) of the electronic device 801 to prevent deterioration of radiation performance. When the side frame of the electronic device 801 is partitioned into a radiator 810 and a floating metal 820 through a transverse partition part, the floating metal 820 may provide a distance (or boundary) between the internal metallic object and the radiator 810 and may interrupt mutual interference. Through this, the radiation performance of the radiator 810 may be improved.

Referring to the radiation efficiency graph 802 of FIG. 8B, when a curve 830 before formation of a transverse partition part and a curve 840 after the formation of the transverse partition part are compared, it may be identified that the radiation performance of the radiator 810 that is partitioned from the floating metal 820 through the transverse partition part is improved by about 1 dB (a width 850) at a designated frequency band (for example, a band of 1 GHz).

Figure 9:
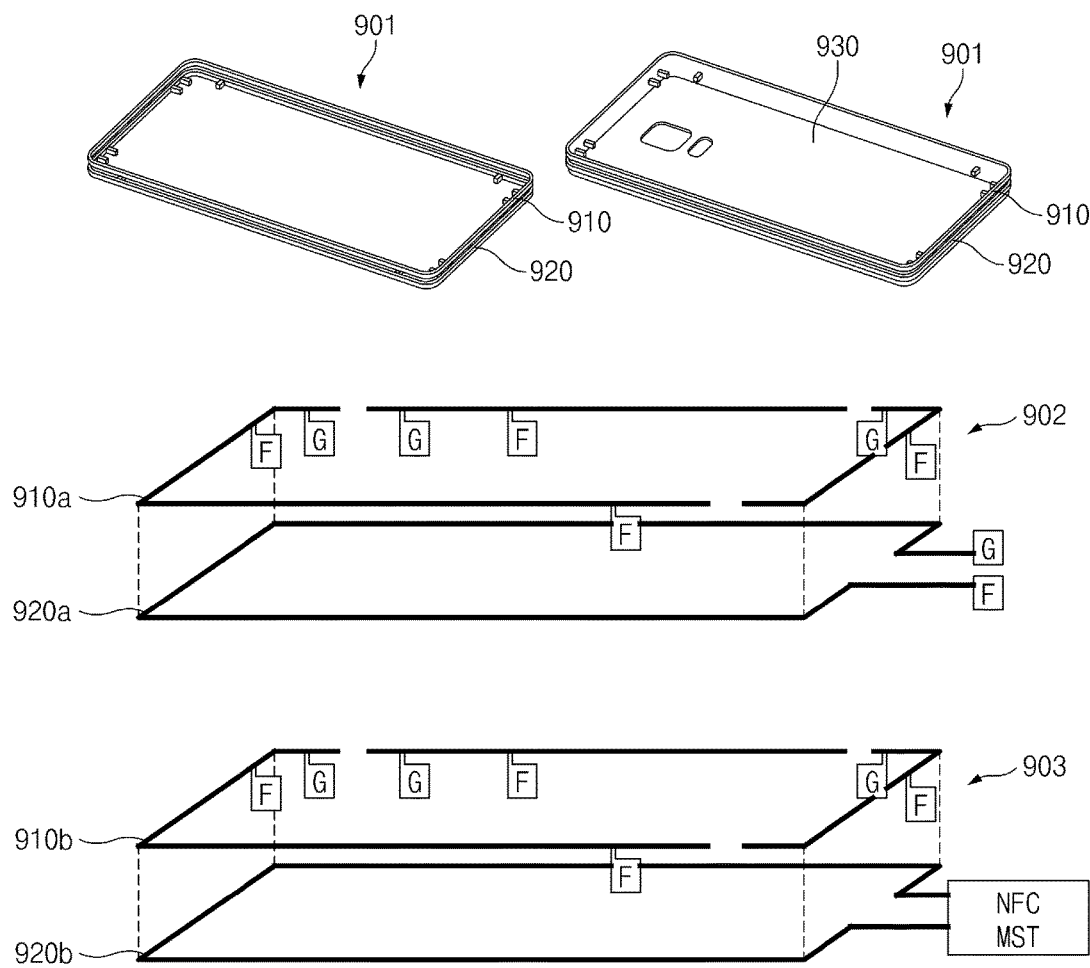
FIG. 9 is a diagram illustrating an antenna through an entire side frame of an electronic device, according to an embodiment of the present disclosure.

FIG. 9 is a diagram illustrating an antenna through an entire side frame of an electronic device, according to an embodiment of the present disclosure.

Referring to FIG. 9, the side frame 901 of the electronic device may include a transverse partition part on upper, lower, left, and right surfaces thereof, and may be partitioned into a first radiator 910 and a second radiator 920 by the transverse partition part. The second radiator 920 may be connected to a rear case 930 of the electronic device.

Each of the first radiator 910 and the second radiator 920 may include a separate longitudinal partition part or an entire loop form may be used.

Referring to the side frame 902, the first radiator 910a and the second radiator 920a may be partitioned by a transverse partition part, and the first radiator 910a may include a separate longitudinal partition part to partition a plurality of radiators. Each of the radiators partitioned by the longitudinal partition part may include a power feeding part and a ground part, and may include a separate antenna. Each of the antennas may transmit and receive signals of a designated frequency band.

The entire loop form of the second radiator 920a may act as one antenna without using a separate longitudinal partition part. The second radiator 920a may be connected to a power feeding part and a ground part to constitute one antenna. The second radiator 920a may act as a loop type power feeding part.

Referring to the side frame 903, the first radiator 910b and the second radiator 920 may be partitioned by a transverse partition part, and the first radiator 910b may include a separate longitudinal partition part to partition a plurality of radiators. Unlike in the side frame 902, the second radiator 920b may be connected to a payment circuit to constitute an antenna for a wireless payment.

Figure 10A:
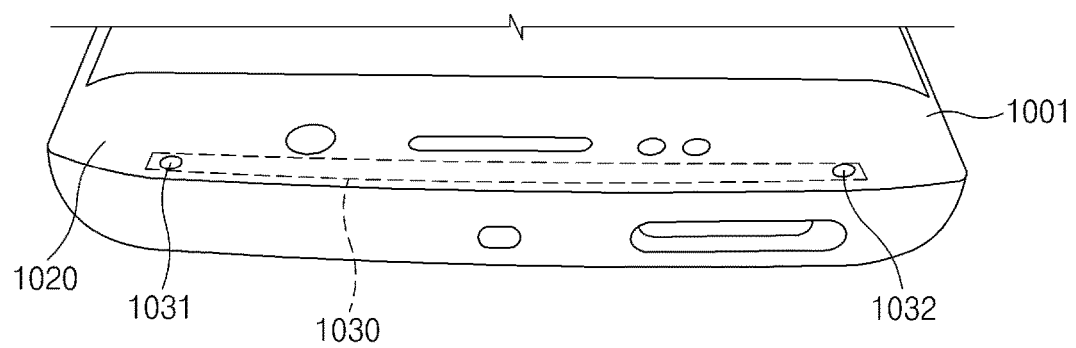
FIG. 10A is a diagram of an electronic device including a ground area on a front surface thereof, according to an embodiment of the present disclosure.
Figure 10B:
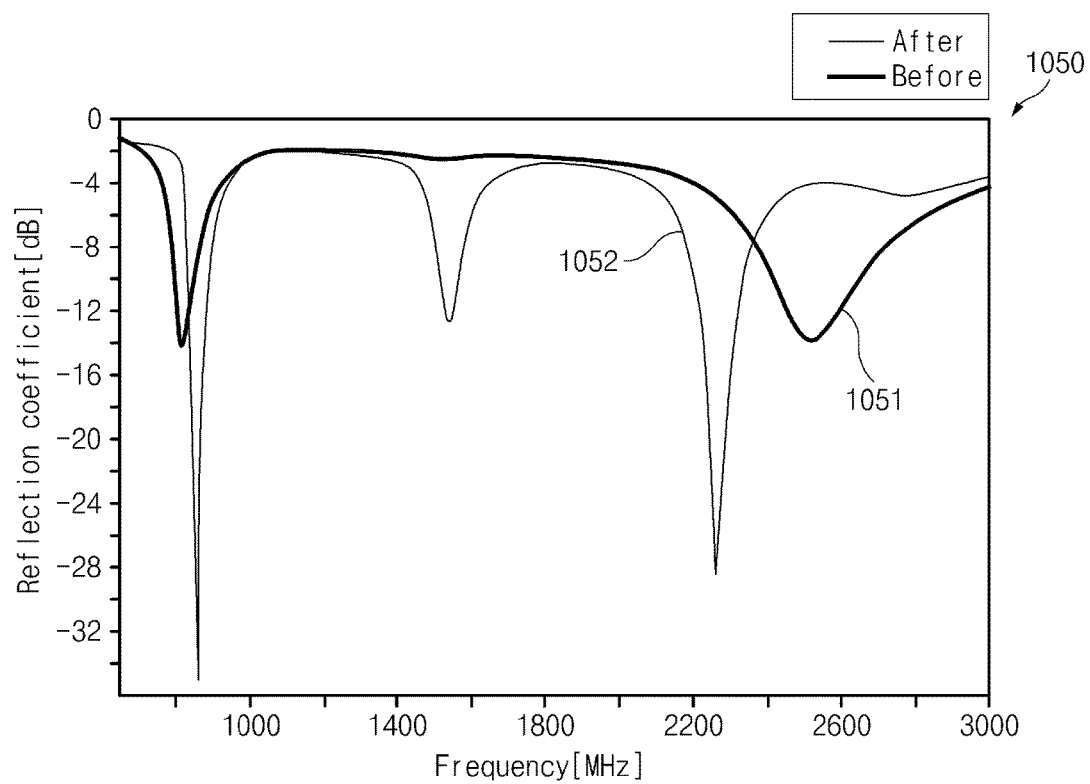
FIG. 10B is a graph of a reflection coefficient vs. frequency, according to an embodiment of the present disclosure.

FIG. 10A is a diagram of an electronic device including a ground area on a front surface thereof, according to an embodiment of the present disclosure, and FIG. 10B is a graph of a reflection coefficient vs. frequency, according to an embodiment of the present disclosure.

Referring to FIG. 10A, the electronic device 1001 may include a separate ground area 1030 on a front surface (a surface on which a display is disposed) of a body 1020. The ground area 1030 may include at least one contact (for example, a contact 1031 and a contact 1032). The ground area 1030 may be connected to a payment circuit in the interior of the electronic device 1001 through the contact. The electronic device 1001 may change a frequency band at which a wireless payment is performed, according to the contact location, and may improve antenna performance. The form or area of the ground area 1030, the location of the contact may be adjusted such that the antenna is operated according to a frequency band that is necessary at a design time point.

Referring to a graph 1050 of FIG. 10B, it may be identified that antenna radiation performance is improved after the ground area 1030 is added (a curve 1052) as compared before the ground area 1030 is added (a curve 1051), and accordingly, the payment device may easily recognize an electronic device and perform a payment.

Figure 11:
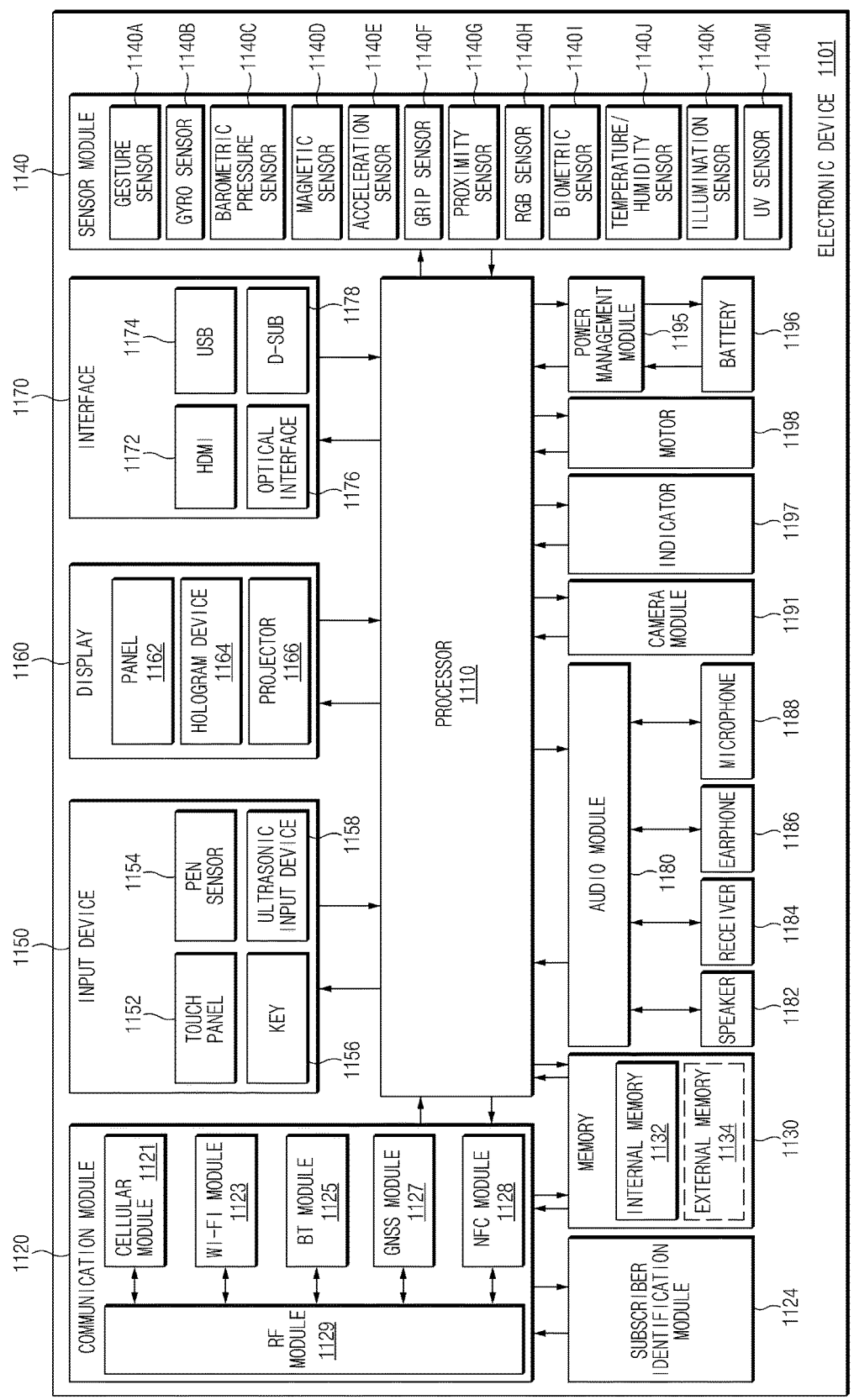
FIG. 11 is a diagram of an electronic device, according to an embodiment of the present disclosure.

FIG. 11 is a diagram of an electronic device 1101, according to an embodiment of the present disclosure. Referring to FIG. 11, the electronic device 1101 may include at least one processor (for example, an application processor (AP) 1110), a communication module 1120, a subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, or a motor 1198.

The processor 1110 may control a plurality of hardware or software components connected to the processor 1110 by driving an operating system or an application program and perform a variety of data processing and calculations. The processor 1110 may be implemented by, for example, a system on chip (SoC). The processor 1110 may further include a graphical processing unit (GPU) and/or an image signal processor. The processor 1110 may include at least some (for example, a cellular module 1121) of the components illustrated in FIG. 11. The processor 1110 may load instructions or data, received from at least one other component (for example, a non-volatile memory), in a volatile memory to process the loaded instructions or data, and may store various types of data in a non-volatile memory.

The communication module 1120 may include, for example, a cellular module 1121, a Wi-Fi module 1123, a Bluetooth module 1125, a GNSS module 1127 (for example, a GPS module, a Glonass module, a Beidou module, or a Galileo module), an NFC module 1128, and a radio frequency (RF) module 1129.

The cellular module 1121 may provide a voice call, a video call, a text message service, or an Internet service through, for example, a communication network. The cellular module 1121 may distinguish between and authenticate electronic devices 1101 within a communication network using a subscriber identification module (for example, the SIM card 1124). The cellular module 1121 may perform at least some of the functions that the processor 1110 may provide. The cellular module 1121 may include a communication processor (CP).

The Wi-Fi module 1123, the BT module 1125, the GPS module 1127, and the NFC module 1128 may include a processor for processing data transmitted/received through the corresponding module. At least some (two or more) of the cellular module 1121, the Wi-Fi module 1123, the Bluetooth module 1125, the GNSS module 1127, and the NFC module 1128 may be included in one integrated chip (IC) or IC package.

The RF module 1129 may transmit/receive, for example, a communication signal (for example, an RF signal). The RF module 1129 may include, for example, a transceiver, a power amp module (PAM), a frequency filter, a low noise amplifier (LNA), or an antenna. At least one of the cellular module 1121, the Wi-Fi module 1123, the Bluetooth module 1125, the GNSS module 1127, or the NFC module 1128 may transmit and receive an RF signal through a separate RF module.

The SIM 1124 may be an embedded SIM, and may further include unique identification information (for example, an integrated circuit card identifier (ICCID)) or subscriber information (for example, international mobile subscriber identity (IMSI)).

The memory 1130 may include, for example, an internal memory 1132 or an external memory 1134. The internal memory 1132 may include at least one of, for example, a volatile memory (for example, a dynamic random access memory (DRAM), a static RAM (SRAM), a synchronous dynamic RAM (SDRAM), and the like) and a non-volatile memory (for example, a one-time programmable read only Memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 1134 may further include a flash drive, for example, a Compact Flash (CF), a Secure Digital (SD), a Micro Secure Digital (Micro-SD), a Mini Secure Digital (Mini-SD), an eXtreme Digital (xD), or a memory stick. The external memory 1134 may be functionally and/or physically connected to the electronic device 1101 through various interfaces.

The sensor module 1140 may measure, for example, a physical quantity or detect an operation state of the electronic device 1101, and may convert the measured or detected information to an electrical signal. The sensor module 1140 may include at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140E a color sensor 1140H (for example, red, green, and blue (RGB) sensor), a biometric sensor 1140I, a temperature/humidity sensor 1140J, an illumination sensor 1140K, and a ultra violet (UV) sensor 1140M. Additionally or alternatively, the sensor module 1140 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling one or more sensors included therein. The electronic device 1101 may further include a processor configured to control the sensor module 1140 as a part of or separately from the processor 1110, and may control the sensor module 1140 while the processor 1110 is in a sleep state.

The input device 1150 may include, for example, a touch panel 1152, a (digital) pen sensor 1154, a key 1156, or an ultrasonic input device 1158. The touch panel 1152 may use at least one of, for example, a capacitive type, a resistive type, an infrared type, and an ultrasonic type. The touch panel 1152 may further include a control circuit. The touch panel 1152 may further include a tactile layer, and provide a tactile reaction to a user.

The (digital) pen sensor 1154 may include, for example, a recognition sheet which is a part of the touch panel or a separate recognition sheet. The key 1156 may include, for example, a physical button, an optical key, or a keypad. The ultrasonic input device 1158 may detect ultrasonic waves generated by an input tool through a microphone 1188 and may identify data corresponding to the detected ultrasonic waves.

The display 1160 may include a panel 1162, a hologram 1164, or a projector 1166. The panel 1162 may be implemented to be, for example, flexible, transparent, or wearable. The panel 1162 may be formed as a single module together with the touch panel 1152. The hologram device 1164 may show a three dimensional image in the air using an interference of light. The projector 1166 may display an image by projecting light onto a screen. The screen may be located, for example, in the interior of or on the exterior of the electronic device 1101. The display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature (D-sub) 1178. Additionally or alternatively, the interface 1170 may include, for example, a mobile high-definition link (MHL) interface, a secure digital (SD) card/multimedia card (MMC) interface, or an infrared data association (IrDA) standard interface.

The audio module 1180 may bilaterally convert, for example, a sound and an electrical signal. The audio codec 1180 may process voice information input or output through, for example, a speaker 1182, a receiver 1184, earphones 1186, or the microphone 1188.

The camera module 1191 is a device which may photograph a still image and a dynamic image. The camera module 291 may include one or more image sensors (for example, a front sensor or a back sensor), a lens, an image signal processor (ISP) or a flash (for example, a light emitting diode (LED) or xenon lamp).

The power management module 1195 may manage, for example, power of the electronic device 1101. The power management module 1195 may include a power management integrated circuit (PMIC), a charger Integrated Circuit (IC), or a battery gauge. The PMIC may have a wired and/or wireless charging scheme. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 1196, and a voltage, a current, or a temperature while charging. The battery 1196 may include, for example, a rechargeable battery and/or a solar battery.

The indicator 1197 may indicate particular status of the electronic device 1101 or a part thereof (for example, the processor 1110), for example, a booting status, a message status, a charging status, or the like. The motor 1198 may convert an electrical signal into mechanical vibrations, and may generate a vibration or haptic effect. Although not illustrated, the electronic device 1101 may include a processing device (for example, a GPU) for supporting a mobile TV. The processing unit for supporting mobile TV may process, for example, media data pursuant to a certain standard of digital multimedia broadcasting (DMB), digital video broadcasting (DVB), or media flow (mediaFlo™).

Each of the elements described in the specification may include one or more components, and the terms of the elements may be changed according to the type of the electronic device. The electronic device may include at least one of the elements described in the specification, and some elements may be omitted or additional elements may be further included. Some of the elements of the electronic device may be coupled to form one entity, and may perform the same functions of the corresponding elements before they are coupled.

The electronic device may include a housing including a first surface, a second surface facing an opposite side of the first surface, and side surfaces surrounding a space between the first surface and the second surface, a first conductive member and a second conductive member forming at least part of the side surfaces, being parallel to the first surface, and extending parallel to each other, a first nonconductive member inserted between the first and second conductive members to electrically isolate the first and second conductive members, and a communication circuit that performs a wireless communication by using the first conductive member and the second conductive member as radiators.

The electronic device may further include a second nonconductive member extending from one end of the first conductive member and extending in a direction perpendicular to the first surface, and a third nonconductive member extending from an opposite end of the first conductive member and extending in a direction perpendicular to the first surface.

The electronic device may further include a third conductive member forming another part of the side surfaces, and the second nonconductive member and the third nonconductive member may isolate at least one of the first conductive member and the second conductive member from the third conductive member.

The electronic device may include a housing including a first surface, a second surface facing an opposite side of the first surface, and side surfaces surrounding a space between the first surface and the second surface, a first conductive member forming at least part of the side surfaces, a second conductive member forming a part of at least one of the first surface and the second surface, a first nonconductive member inserted between the first and second conductive members to electrically isolate the first and second conductive members, and a communication circuit that performs a wireless communication by using at least one of the first and second conductive members as a radiator.

An electronic device may include a conductive member surrounding a side surface of the electronic device, and a first nonconductive member extending in a direction parallel to a front surface or a rear surface of the electronic device to partition the conductive member, and the conductive member may be utilized as an antenna radiator.

The conductive member may be partitioned into a first radiator adjacent to the front surface of the electronic device and a second radiator adjacent to the rear surface of the electronic device by the first nonconductive member.

The first radiator may transmit and receive signals of a first frequency band, and the second radiator may transmit and receive signals of a second frequency band that is different from the first frequency band by a designated frequency value or more. The first radiator may transmit and receive signals for a short range communication or a wireless payment, and the second radiator may transmit and receive signals for a cellular communication. The first radiator may be connected to a plurality of ground parts, and the second radiator may be connected to at least one power feeding part and at least one ground part. The plurality of ground parts may be connected to the ground through switches, respectively, and a frequency band of signals transmitted and received through the first radiator or the second radiator may be changed based on operations of the switches.

The first radiator and the second radiator may receive the same power signal through a board in the interior of the electronic device and may transmit and receive signals of the same or adjacent frequency bands.

The first nonconductive member may extend in a direction parallel to a display disposed on the front surface of the electronic device. The conductive member may surround an upper end side area of the electronic device. The conductive member may be partitioned into a floating metal adjacent to the front surface of the electronic device and a radiator adjacent to the rear surface of the electronic device by the first nonconductive member.

The electronic device may further include a second nonconductive member extending in a direction perpendicular to a front surface or a rear surface of the electronic device to partition the conductive member. The conductive member may be partitioned into a first radiator adjacent to the front surface of the electronic device and a second radiator adjacent to the rear surface of the electronic device by the first nonconductive member, and the first radiator may be partitioned into a plurality of sub-radiators by the second conductive member. The second radiator may be connected to a power feeding part and a ground part, and the plurality of sub-radiators may transmit and receive multiband frequency signals through a loop power feeding part of the second radiator.

An electronic device may include a conductive member disposed on a side surface of the electronic device, and a first nonconductive member extending in a direction parallel to a front surface or a rear surface of the electronic device to partition the conductive member. The conductive member may be partitioned into a first radiator adjacent to the front surface of the electronic device and a second radiator adjacent to the rear surface of the electronic device by the first nonconductive member. The first radiator may transmit and receive signals of a first frequency band, and the second radiator may transmit and receive signals of a second frequency band that is different from the first frequency band by a designated frequency value or more.

A multiband antenna can be implemented by using one side frame without forming a separate additional pattern through a transverse partition part.

When a part of the side frame is used as a wireless payment antenna through the transverse partition part, the recognition rate of an external device can be improved in a wireless payment process.

The efficiency of a cellular communication can be improved by preventing deterioration of radiation performance due to the human body.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:
1. An electronic device comprising:
a housing including a first surface, a second surface facing the first surface, and side surfaces surrounding a space between the first surface and the second surface;
a first conductive member and a second conductive member forming at least part of the side surfaces, being parallel to the first surface, and extending parallel to each other;
a first nonconductive member disposed between the first conductive member and the second conductive member to electrically isolate the first conductive member and the second conductive member from each other;
a second nonconductive member extending from a first end of the first nonconductive member, in a direction perpendicular to the first surface a third nonconductive member extending from a second end of the first nonconductive member and extending in a direction perpendicular to the first surface; and
a communication circuit configured to perform wireless communication via at least one of the first conductive member and the second conductive member.

2. The electronic device of claim 1, further comprising:
a third conductive member, which forms a part of the side surfaces,
wherein the second nonconductive member and the third nonconductive member are configured to electrically isolate at least one of the first conductive member and the second conductive member from the third conductive member.

3. An electronic device comprising:
a housing including a first surface, a second surface facing the first surface, and side surfaces surrounding a space between the first surface and the second surface;
a first conductive member forming at least part of the side surfaces;
a second conductive member forming a part of at least one of the first surface and the second surface;
a first nonconductive member disposed between the first conductive member and the second conductive member to electrically isolate the first conductive member and the second conductive member from each other;
a second nonconductive member extending from a first end of the first nonconductive member a third nonconductive member extending from a second end of the first nonconductive member and extending in a direction perpendicular to the first surface; and
a communication circuit configured to perform wireless communication via at least one of the first conductive and the second conductive member as a radiator.

4. An electronic device comprising:
a conductive member surrounding side surface of the electronic device; and
a first nonconductive member extending in a direction parallel to one of a front surface and a rear surface of the electronic device to partition the conductive member,
wherein the conductive member is configured to be utilized as an antenna radiator,
wherein the conductive member is partitioned into a first radiator part and a second radiator part wherein the first radiator part is adjacent to the front surface of the electronic device and the second radiator part is adjacent to the rear surface of the electronic device, wherein the first radiator part is connected to a plurality of ground parts, and
wherein the second radiator part is connected to at least one power feeding part and at least one ground part of the plurality of ground parts.

5. The electronic device of claim 4, wherein the first radiator part transmits and receives signals of a first frequency band, and the second radiator part transmits and receives signals of a second frequency band that is different from the first frequency band by a designated frequency value.

6. The electronic device of claim 4, wherein the first radiator part transmits and receives signals for one of a short range communication and a wireless payment, and the second radiator part transmits and receives signals for a cellular communication.

7. The electronic device of claim 4, wherein the plurality of ground parts are connected to a ground through switches, and a frequency band of signals transmitted and received through one of the first radiator part and the second radiator part is changed based on an operation of the switches.

8. The electronic device of claim 4, wherein the first radiator part and the second radiator part receive the same power signal through a board in an interior of the electronic device and transmit and receive signals of one of the same and adjacent frequency bands.

9. The electronic device of claim 4, wherein the first nonconductive member extends in a direction parallel to display disposed on the front surface of the electronic device.

10. The electronic device of claim 4, wherein the conductive member surrounds an upper end side area of the electronic device.

11. The electronic device of claim 4, wherein the conductive member is partitioned into a floating metal that is adjacent to the front surface of the electronic device and a radiator that is adjacent to the rear surface of the electronic device by the first nonconductive member.

12. The electronic device of claim 4, further comprising a second nonconductive member extending in a direction perpendicular to one of the front surface and the rear surface of the electronic device to partition the conductive member.

13. The electronic device of claim 12, wherein the first radiator part is partitioned into a plurality of sub-radiators by the second nonconductive member.

14. The electronic device of claim 13, wherein the second radiator part is connected to the at least one power feeding part and the at least one ground part, and the plurality of sub-radiators transmit and receive multiband frequency signals through a loop power feeding part of the second radiator part.

15. An antenna mounted on an electronic device, the antenna comprising:
a conductive member disposed on a side surface of the electronic device; and
a first nonconductive member extending in a direction parallel to one of a front surface and a rear surface of the electronic device to partition the conductive member,
wherein the conductive member is partitioned into a first radiator part and a second radiator part,
wherein the first radiator part is configured to at least one of transmit and receive signals of a first frequency band, and the second radiator part is configured to at least one of transmit and receive signals of a second frequency band that is different from the first frequency band, wherein the first radiator part is adjacent to the front surface of the electronic device and the second radiator part is adjacent to the rear surface of the electronic device, wherein the first radiator part is connected to a plurality of ground parts, and wherein the second radiator part is connected to at least one power feeding part and at least one ground part of the plurality of ground parts.

16. The antenna of claim 15, wherein the second frequency band is different from the first frequency band by a designated frequency value.

* * * * *